(No Model.) 3 Sheets—Sheet 1.

W. H. ALBACH.
COMBINED SEED PLANTER AND FERTILIZER DISTRIBUTER.

No. 292,460. Patented Jan. 29, 1884.

(No Model.) 3 Sheets—Sheet 2.
W. H. ALBACH.
COMBINED SEED PLANTER AND FERTILIZER DISTRIBUTER.
No. 292,460. Patented Jan. 29, 1884.
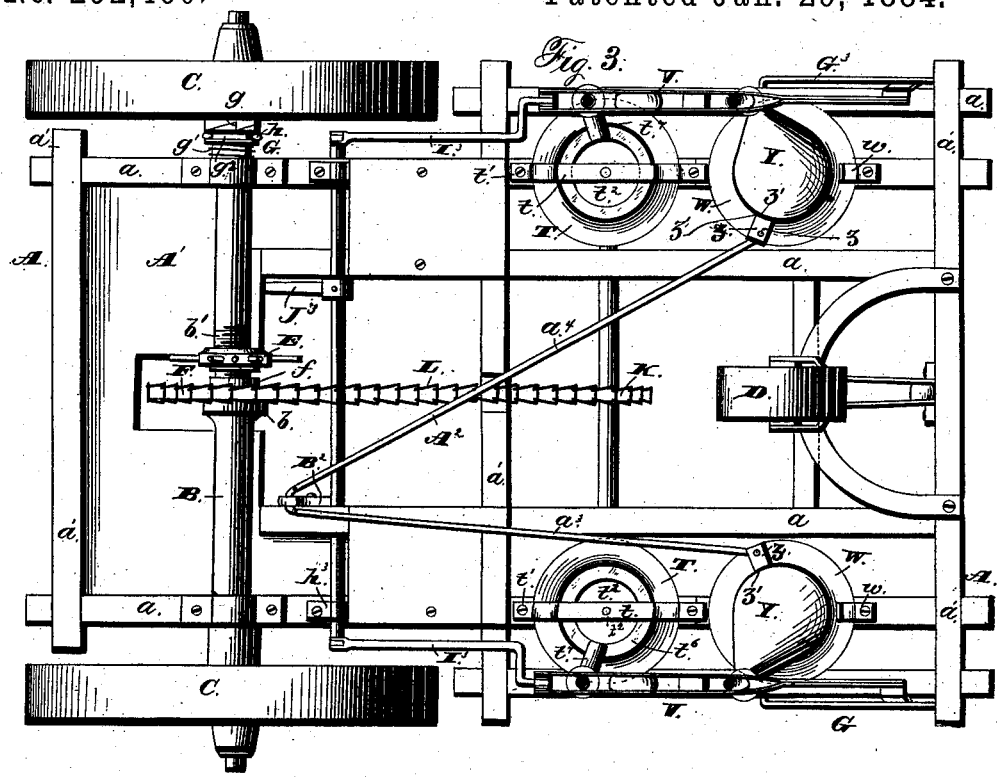
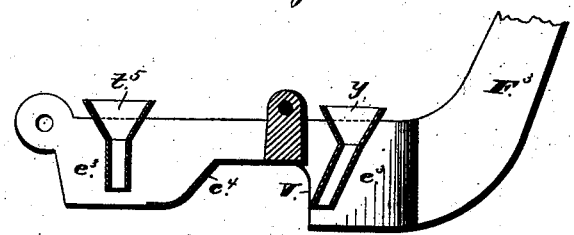
WITNESSES
Jas. E. Hutchinson
George W. Cook
INVENTOR
W H Albach
Attorney (No Model.) 3 Sheets—Sheet 3.
W. H. ALBACH.
COMBINED SEED PLANTER AND FERTILIZER DISTRIBUTER.
No. 292,460. Patented Jan. 29, 1884.
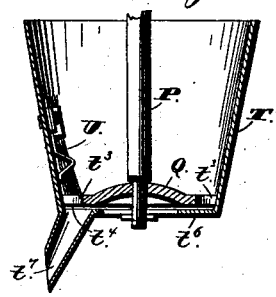
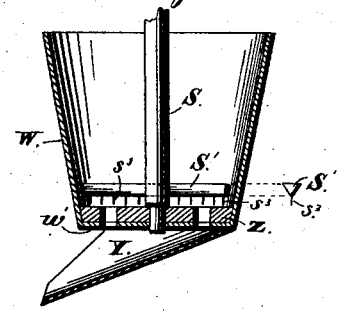
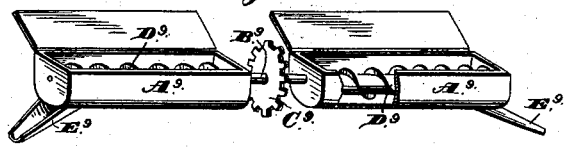
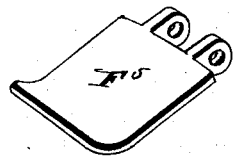
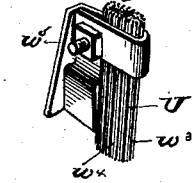
WITNESSES
Jas. E. Hutchinson
George W. Cook
INVENTOR
W. H. Albach
By H. A. Guymon
Attorney

UNITED STATES PATENT OFFICE.

W. HARRISON ALBACH, OF MANSFIELD, OHIO, ASSIGNOR OF ONE-HALF TO JOHN F. STINE, OF SAME PLACE.

COMBINED SEED-PLANTER AND FERTILIZER-DISTRIBUTER.

SPECIFICATION forming part of Letters Patent No. 292,460, dated January 29, 1884.

Application filed February 6, 1883. (No model.)

*To all whom it may concern:*

Be it known that I, W. H. ALBACH, of Mansfield, in the county of Richland and State of Ohio, have invented certain new and useful Improvements in Combined Seed-Planters and Fertilizer-Distributers; and I do hereby declare the following to be a full, clear, and exact description of the invention, such as will enable others skilled in the art to which it pertains to make and use the same.

My invention relates to machines for automatically planting seeds and drilling phosphates.

The invention consists in the features of construction and combinations of parts hereinafter fully described, and pointed out in the claims.

Figure 1:
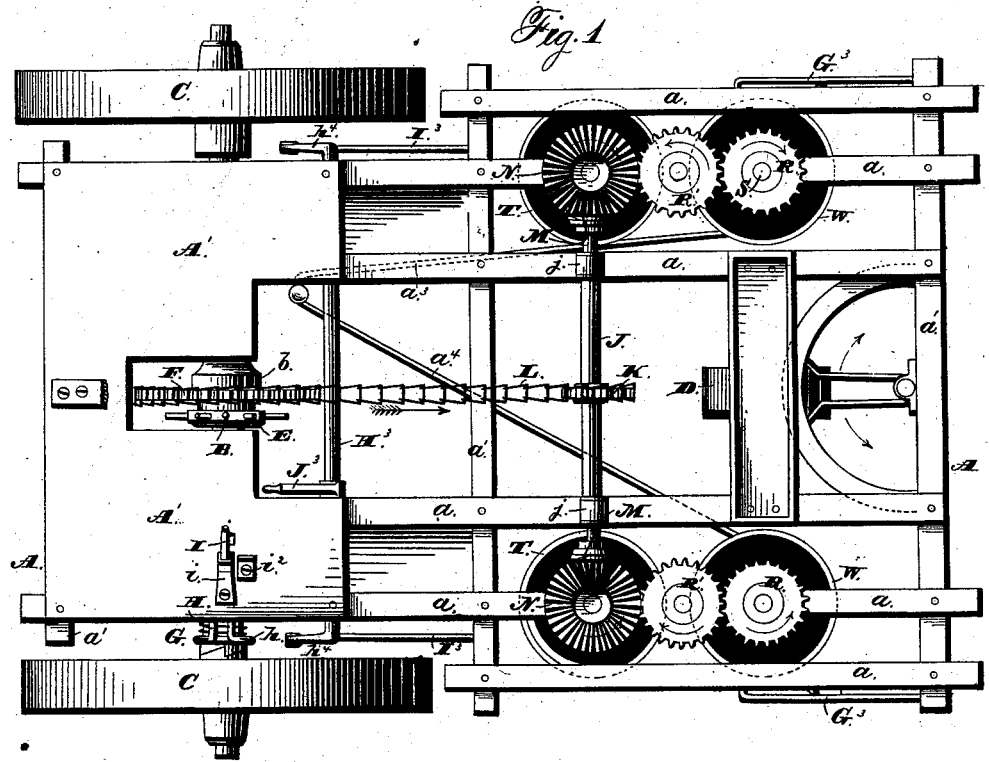
Figure 2:
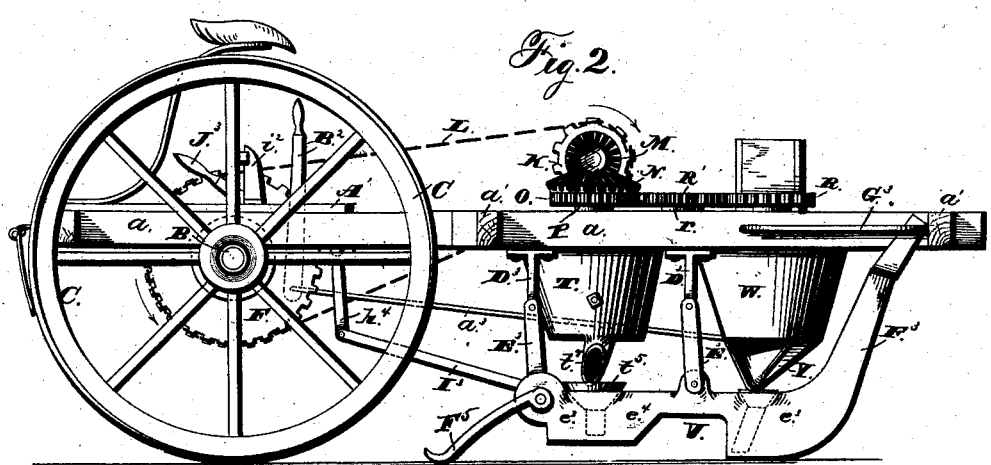

In the drawings, Figure 1 represents a plan view of a machine constructed in accordance with my invention. Fig 2 is a side elevation of the same. Fig. 3 is a reverse plan view the coverers being removed. Figs. 4, 5, and 6, illustrate parts in detail. Fig. 7 represents devices for supplying phosphate automatically to the phosphate-cylinders; Fig. 8, a detached perspective view of the coverer; and Fig. 9 is a detached view of brush U.

A represents the frame of the machine, consisting of longitudinal bars $a$ and cross-bars $a'$, and supported near its rear end by an axle, B, upon which are mounted the carrying-wheels C C, and at its forward end by a guiding or caster wheel, D, suitably pivoted to the forward cross-bar of the frame. Said axle B is provided with an annular flange or collar, $b$, and is screw-threaded at the point $b'$, to receive an interiorly-threaded hand-wheel, E.

F represents a sprocket-wheel loosely mounted on the axle, but adapted to bear against the flange $b$ of the latter, and provided with an annular collar, $f$, against which the hand-wheel E bears, to hold the sprocket-wheel F in rigid connection with the axle when it is desired to operate the machine. Instead of this arrangement for throwing the sprocket-wheel into and out of rigid connection with the axle, said sprocket-wheel may be rigidly mounted upon the axle, and the carrying-wheels C C may be arranged to revolve independently of the axle, and the latter is provided with a sliding clutch, G, on the inner side of each of the wheels C C. Said clutches are toothed, to engage teeth $g$, formed on the inner sides of the wheel-hubs, and are keyed to the axles, to turn therewith. Each of said clutches or disks is provided with a spiral spring, $g'$, to hold it in engagement with the wheel, and also provided with an annular groove, $g^2$, which receives the embracing-fingers $h$ of a loop, H, the inner end of which receives the short arm of a lever, I, fulcrumed in a bracket, $i$, secured upon a platform, A', over the axle, said lever being adapted to engage a catch, $i^2$, secured upon said platform, to hold the wheels out of rigid connection with the axle when it is not desired to revolve the sprocket-wheel.

J represents a shaft arranged parallel with the axle of the machine, and mounted in bracket-bearings $j$, upon the upper side of the frame A, adjacent to the feeding mechanism.

K represents a sprocket-wheel mounted centrally on the shaft J, and connected by an endless chain, L, with the sprocket-wheel F.

On each end of the shaft J is rigidly mounted a beveled-gear pinion, M, which mesh with the beveled crown-wheels N, which latter are rigidly secured upon spur-wheels O, mounted upon vertical shafts P, the latter having bearing in the adjacent bars $a$ of the frame, and projecting into the seed-cylinders, and carrying at their lower ends revolving disks Q. The spur-wheels R, mounted upon the shafts S of the fertilizer-cylinders, are operated by the wheels O through the intermediate spur-wheels, R', mounted upon studs $r$, secured to the frame A. Said shafts S are provided with sweeps S'.

T T represent the seed-cylinders, each secured upon the under side of the frame by means of an embracing-band, $t$, secured to the frame, said bands being perforated to form bearings $t^2$ for the shafts P P. The cylinders T T are provided with open bottoms $t^4$, which latter are covered by the disks Q, said disks being each provided with any desired number of slots or openings, $t^3$, and resting upon flanges $t^6$ of the cylinders.

U U represent ejecting-brushes, consisting of bristles $w^4$ and spring-wire $w^3$, or a flat-spring, $w^5$, secured by any desired means within the cylinders T T, adjacent to the discharge-openings $t^4$ $t^4$ of the cylinders, and adapted to discharge the seeds carried by the revolving disks Q through the discharge-tubes $t^5$ and into the funnel $t^5$ of a double shoe, V.

I prefer to construct the brush U out of wire and bristles, as it enables me to employ brushes of convenient size that will be sufficiently stout and flexible for the purpose in view.

W W represent fertilizer-cylinders arranged in front of the seed-cylinders, and secured to the frame by the bands $t$ $t$ of the seed-cylinders and brackets $w$. These fertilizer-cylinders W are provided with perforated bottoms $w'$ and beneath said bottoms with discharge-funnels Y Y, which deliver the fertilizer to the forward funnels, $y$ $y$, of the double shoes V V.

Z Z represent perforated disks, arranged between the perforated bottoms $w'$ of the fertilizer-cylinders and the sweeps. These disks Z Z are perforated, to correspond to the perforations of the bottoms of the cylinders, and are pivotally secured upon the lower ends of the shafts S S, which project through the bottoms of the fertilizer-cylinders. Each of said disks Z Z is provided with an inwardly-projecting arm, $z$, projecting through a slot, $z'$, of the fertilizer-cylinder and connected with a link, $A^2$, consisting of the horizontal rod $a^3$ and the diagonal rod $a^4$, and secured at the junction of these rods to an operating-lever, $B^2$, fulcrumed on the frame of the machine within easy reach of the driver, so that the disks Z Z may be operated to drop the fertilizer as desired.

The shoes V V are both of the same construction; hence a description of one only will be given. The shoe is pivotally supported by hangers $D^3$ $D^3$, secured upon the under side of the side bar, $a$, by links $E^3$ $E^3$, and consists of the discharge portions $e^3$ $e^3$ and forward extension, $F^3$, the upper end of the latter projecting into an elongated staple, $G^3$, secured upon the side bar, $a$. The forward portion, $e^3$, of the shoe is longer than, and projects below, the rear portion, $e^3$, thus being adapted to be entered deeper into the soil than the rear shoe, to drill phosphate, and the forward portion, $e^4$, of the rear shoe, $e^3$, operates as a coverer for the phosphate, thus adapting the seed to be deposited upon the covered phosphate and covered with soil by means of the coverers $F^5$.

$H^3$ represents a rock-shaft supported in bracket-bearings $h^3$, on the under side of the frame A, and adjacent to and parallel with the axle. Said shaft is provided at each end with a downwardly-projecting arm, $h^4$, which receives one end of a rod or link, $I^3$, the forward end of the latter being pivoted to the rear end of the shoe V. The shaft $H^3$ is also provided with an operating-lever, $J^3$, for raising and lowering the shoes V, to regulate the depth of their insertion into the soil. It will thus be observed that the feeding devices of the machine are under complete control and may be readily regulated by the driver.

The brushes U U, as above described, consist of bristles combined with a spring wire or wires or a flat spring. This construction affords a brush of the necessary rigidity, avoiding the objection incident to the use of an ordinary bristle brush, and also that of a metal ejector.

The construction of the seed-cylinder with the bottom flange, $t^6$, to receive the disk Q, affords an edge-feed from the cylinder, and discharges all dirt which may collect in the bottom of the cylinder through the opening in the latter.

A further advantage of my improvement is found in the construction of the sweeps $S'$ of the phosphate-cylinders, said sweeps being of wedge form, and provided on their undersides with teeth or spurs $s^3$, to agitate the phosphate only at the bottom, thus insuring a positive force feed.

In Fig. 7 are represented devices for automatically supplying phosphate to the drills.

$A^9$ $A^9$ are receptacles or boxes, through which extends a shaft, $B^9$, provided centrally with a sprocket-wheel, $C^9$, adapted to be connected with the operating-shaft of the machine by a suitable chain-wheel. Upon this shaft $B^9$ and within the receptacles $A^9$ $A^9$ are arranged spiral conveyers $D^9$ $D^9$, adapted to discharge the phosphate through discharge channels or spouts $E^9$ $E^9$ into the phosphate-cylinders. By the means thus shown and described the phosphate-cylinders are kept supplied.

It will be apparent that, instead of depositing the seed upon the covered phosphate, the seed may first be planted and covered, and the phosphate dropped upon it by arranging the seed-cylinders in front of the phosphate-cylinders, the phosphate in such instance being covered by the coverers $F^5$.

I do not limit myself to the exact construction shown, but reserve the right to make all such modifications as may fall within the scope of my invention.

Having fully described my invention, what I claim as new, and desire to secure by Letters Patent, is—

1. In a combined seed-planter and fertilizer-distributer, the combination, with the machine-frame, the rear axle carrying a shiftable sprocket-wheel, the transverse shaft carrying a fixed sprocket-wheel, and provided at each end with a beveled-gear pinion, a drive-chain connecting said sprocket-wheels, and the gear-disks mounted upon the frame, of the double-shoe runners pivoted beneath each side of the frame, the seed-distributers connected each by a beveled gear with the transverse shaft, and the fertilizer-distributers connected each by a beveled gear to the said gear-disks upon the frame, said gear-disks being each placed between the corresponding seed and fertilizer distributers, and said distributers being arranged in pairs at each side of the frame, as set forth.

2. The machine-frame, the rear axle carrying a shiftable sprocket-wheel, the transverse shaft carrying a fixed sprocket-wheel, and provided at its extremities with beveled-gear wheels, the drive-chain connecting said sprocket-wheels, and the seed and fertilizer distributers arranged in pairs at each side of the machine, in combination with the double-shoe single runners, each of which is pivotally secured beneath the frame, and the coverers secured to the rear extremities of said runners, substantially as set forth.

3. The combination, with the machine-frame, the axle, the transverse shaft, the fixed and shiftable sprocket-wheels of said shafts, the drive-chain, and the seed and fertilizer distributers, of the double-shoe single runners, each provided at its forward and deeper portion with a fertilizer-spout and at its rear and shallow portion with a seed-spout, the coverer $F^5$, and hangers $D^3$ $E^3$, for attaching the shoes to the frame, and the coverers $F^5$, secured to the rear ends of said shoes, as set forth.

4. The combination, with the seed-cylinder, of the ejector-brush secured thereto, and composed of resilient metal and bristles, substantially as and for the purpose set forth.

5. The combination, with the axle and sprocket-wheel, of devices for throwing said wheel into and out of rigid connection with said axle, a transverse shaft supported upon the frame in front of the axle, and provided with a sprocket-wheel and a chain connecting it with the sprocket-wheel on the axle, and at its ends with beveled-gear pinions, the intermediate gears, and the fertilizer and seed cylinders provided with vertical feed-shafts, and dropping devices, and the double shoe pivotally secured to the frame, and provided with receptacles to receive and deliver the seed, and with means for raising and lowering it, substantially as set forth.

6. The combination, with the hangers secured to the under sides of the forward side bars of the machine, and the double shoes having forward portions longer than the rear portions, which latter are provided with coverers and pivotally connected to said hangers by links, and having forward extensions guided by elongated staples secured to the said side bars, of the rock-shaft supported in bearings on the machine, and provided with forwardly-projecting arms connected by links to the rear ends of the shoe, and the phosphate and seed cylinders having dropping devices, substantially as described.

7. The combination, with the phosphate-cylinders, of boxes supported upon the frame, and provided, respectively, with spouts emptying each into one of the said cylinders, and provided with a common shaft carrying sets of spiral right and left handed conveyers, and means for operating said shaft, substantially as set forth.

8. The combination, with a phosphate-cylinder provided with a perforated bottom and an inclined discharge-chute, of the shaft located therein, and a wedge-shaped sweep secured thereto, and provided with a series of fine metal pins, whereby the phosphate in the bottom of the cylinder is agitated, substantially as set forth.

In testimony whereof I have signed this specification in the presence of two subscribing witnesses.

W. HARRISON ALBACH.

Witnesses:
M. E. DOUGLAS,
E. H. HOUSTON.